US012568242B2

(12) United States Patent　　　　(10) Patent No.:　US 12,568,242 B2
Gao et al.　　　　　　　　　　　　　　(45) Date of Patent:　　　Mar. 3, 2026

(54) IMPLICIT MASKED BLENDING MODE COMBINED WITH MV REFINEMENT METHODS

(71) Applicant: Tencent America LLC, Palo Alto, CA (US)

(72) Inventors: Han Gao, Palo Alto, CA (US); Xin Zhao, Palo Alto, CA (US); Liang Zhao, Palo Alto, CA (US); Jing Ye, Palo Alto, CA (US); Shan Liu, Palo Alto, CA (US)

(73) Assignee: TENCENT AMERICA LLC, Palo Alto, CA (US)

( * ) Notice:　Subject to any disclaimer, the term of this patent is extended or adjusted under 35 U.S.C. 154(b) by 47 days.

(21) Appl. No.: 18/241,763

(22) Filed:　　Sep. 1, 2023

(65)　　　　　　Prior Publication Data

US 2025/0024070 A1　　　Jan. 16, 2025

Related U.S. Application Data

(60) Provisional application No. 63/526,890, filed on Jul. 14, 2023.

(51) Int. Cl.
H04N 19/563　　　　(2014.01)
H04N 19/105　　　　(2014.01)
　　　　　　　(Continued)

(52) U.S. Cl.
CPC ......... H04N 19/563 (2014.11); H04N 19/105 (2014.11); H04N 19/139 (2014.11);
　　　　　　(Continued)

(58) Field of Classification Search
CPC .. H04N 19/105; H04N 19/139; H04N 19/159; H04N 19/172; H04N 19/174;
　　　　　　(Continued)

(56)　　　　　　References Cited

U.S. PATENT DOCUMENTS 9,398,293 B2　7/2016　Wang et al.
11,363,265 B2　6/2022　Ahn
　　　　　　(Continued)

OTHER PUBLICATIONS

Benjamin Bross et al., "Versatile Video Coding Editorial Refinements on Draft 10", Document: JVET-T2001-v2, Joint Video Experts Team (JVET) of ITU-T SG 16 WP 3 and ISO/IEC JTC 1/SC 29, 20th Meeting, by teleconference, Oct. 7-16, 2020, 541 pgs.
　　　　　　(Continued)

*Primary Examiner* — Jeremiah C Hallenbeck-Huber
(74) *Attorney, Agent, or Firm* — Morgan, Lewis & Bockius LLP

(57)　　　　　　ABSTRACT

A computing system receives a video bitstream that comprises a current block within a current picture and one or more syntax elements. The current block is encoded in a subblock-based motion vector (MV) refinement mode using information from a first reference block and a second reference block. The system applies a MV refinement to generate a refined first MV indicating a first location of the first reference block and a refined second MV indicating a second location of the second reference block. Subsequent to applying the MV refinement, in accordance with a determination that (i) the first location is outside of a first set of reference boundaries and/or (ii) the second location is outside of a second set of reference boundaries, the system decodes the current block using a weighted average of respective values from the first and second locations.

20 Claims, 9 Drawing Sheets

Reference Picture 572

Reference Picture 574

Area 580

Area 582

Reference boundary 586

Reference Block 576

Area 584

Reference boundary 588

Reference Block 578

(51) Int. Cl.

| | |
|---|---|
| *H04N 19/139* | (2014.01) |
| *H04N 19/159* | (2014.01) |
| *H04N 19/172* | (2014.01) |
| *H04N 19/174* | (2014.01) |
| *H04N 19/176* | (2014.01) |
| *H04N 19/52* | (2014.01) |
| *H04N 19/55* | (2014.01) |

(52) U.S. Cl.
CPC ......... *H04N 19/159* (2014.11); *H04N 19/172* (2014.11); *H04N 19/174* (2014.11); *H04N 19/176* (2014.11); *H04N 19/52* (2014.11); *H04N 19/55* (2014.11)

(58) Field of Classification Search
CPC ...... H04N 19/176; H04N 19/52; H04N 19/55; H04N 19/563
See application file for complete search history.

(56) References Cited

U.S. PATENT DOCUMENTS

| | | | |
|---|---|---|---|
| 11,570,432 B2 | 1/2023 | Kanoh et al. | |
| 11,882,282 B2 | 1/2024 | Lee | |
| 11,949,894 B2 | 4/2024 | Xu et al. | |
| 11,973,962 B2 | 4/2024 | Zhang et al. | |
| 12,047,581 B2 | 7/2024 | Chen et al. | |
| 12,095,984 B2 | 9/2024 | Li et al. | |
| 12,120,346 B2 | 10/2024 | Zhao et al. | |
| 12,143,595 B2 | 11/2024 | Otsuka | |
| 12,206,861 B2 | 1/2025 | Li et al. | |
| 2013/0266070 A1 | 10/2013 | Sato | |
| 2017/0280090 A1 | 9/2017 | Raskin | |
| 2018/0278950 A1 | 9/2018 | Chen et al. | |
| 2020/0029087 A1 | 1/2020 | Lim et al. | |
| 2020/0029090 A1 | 1/2020 | Alshin et al. | |
| 2021/0160527 A1 | 5/2021 | Chuang et al. | |
| 2021/0266531 A1 | 8/2021 | Kang et al. | |
| 2021/0281852 A1 | 9/2021 | Alshina et al. | |
| 2022/0109861 A1 | 4/2022 | Hannuksela et al. | |
| 2022/0167003 A1 | 5/2022 | Li et al. | |
| 2022/0239950 A1 | 7/2022 | Zhang et al. | |
| 2022/0272373 A1 | 8/2022 | Moon et al. | |
| 2022/0329797 A1 | 10/2022 | Liao et al. | |
| 2022/0329852 A1 | 10/2022 | Sullivan et al. | |
| 2023/0140041 A1 | 5/2023 | Gan | |
| 2023/0224472 A1 | 7/2023 | Chen et al. | |
| 2023/0247216 A1* | 8/2023 | Huang ................... H04N 19/44 375/240.15 |
| 2023/0328257 A1* | 10/2023 | Zhang ................. H04N 19/182 |
| 2023/0336773 A1 | 10/2023 | Zhao et al. | |
| 2023/0345023 A1 | 10/2023 | Chen | |
| 2023/0388484 A1 | 11/2023 | Gao | |
| 2023/0403392 A1 | 12/2023 | Wang | |
| 2024/0137552 A1 | 4/2024 | Li et al. | |
| 2024/0291982 A1 | 8/2024 | Wang | |
| 2024/0364905 A1 | 10/2024 | Mao et al. | |
| 2024/0430448 A1 | 12/2024 | Gao et al. | |
| 2025/0008137 A1 | 1/2025 | Gao et al. | |
| 2025/0024055 A1 | 1/2025 | Gao et al. | |
| 2025/0024070 A1 | 1/2025 | Gao et al. | |
| 2025/0039364 A1 | 1/2025 | Wang | |
| 2025/0220221 A1* | 7/2025 | Leléannec ........... H04N 19/563 |

OTHER PUBLICATIONS

Han Gao et al., "Implicit Masked Blending Mode", Document: CWG-D057_v1, Alliance for Open Media Codec Working Group, Jun. 7, 2023, 3 pgs.

Han Gao et al., "Joint Proposal of CWG-D057 and CWG-CWG-D062", Document: CWG-D071_v5, Alliance for Open Media Codec Working Group, Jun. 21, 2023, 4 pgs.

Han Gao et al., "Wedge Mode Extensions", Document: CWG-C092_v1, Alliance for Open Media Codec Working Group, Dec. 14, 2022, 4 pgs.

Leo Zhao et al., "Advanced Motion Vector Difference Coding", Document: CWG-B092, Alliance for Open Media, Codec Working Group, Nov. 24, 2021, 7 pgs.

Leo Zhao et al., "Improved Adaptive MVD Resolution", Document: CWG-C011, Alliance for Open Media, Codec Working Group, Feb. 9, 2022, 7 pgs.

Mohammed Golam Sarwer et al., "Sub-block Based MV Refinement", Documeny CWG-D031v6, Alliance for Open Media Codec Working Group, Apr. 10, 2023, 19 pgs.

Peter de Rivaz et al., "AV1 Bitstream & Decoding Process Specification", The Alliance for Open Media, Jan. 8, 2019, 681 pgs. Retrieved from the Internet: https://aomediacodec.github.io/av1-spec/av1-spec.pdf.

Xin Zhao et al., "Tool Description for AV1 and Libaom", Document: CWG-B078_v1, Alliance for Open Media Codec Working Group, Oct. 4, 2021, 41 pgs.

Yue Chen et al., "An Overview of Core Coding Tools in the AVI Video Codec", 2018 IEEE Picture Coding Symposium, San Francisco, CA, USA, 5 pgs.

Elliott Karpilovsky et al., "Proposal: New Inter Modes for AV2", Alliance for Open Media, Codec Working Group, Document: CWG-B018 v1, Frb. 24, 2021, 6 pgs.

Tencent Technology, ISRWO of 7827-WO, PCT/CN2023/032331, Dec. 15, 2023, 16 pgs.

Tencent Technology, ISRWO of 7829-WO, PCT/CN2023/032336, Dec. 18, 2023, 14 pgs.

Tencent Technology, ISRWO of 7835-WO, PCT/CN2023/032338, Dec. 11, 2023, 5 pgs.

Tencent Technology, ISRWO of 7844-WO, PCT/CN2023/032341, Dec. 12, 2023, 11 pgs.

Tencent Technology, ISRWO of 7845-WO, PCT/CN2023/032344, Dec. 12, 2023, 14 pgs.

* cited by examiner

Figure 1:
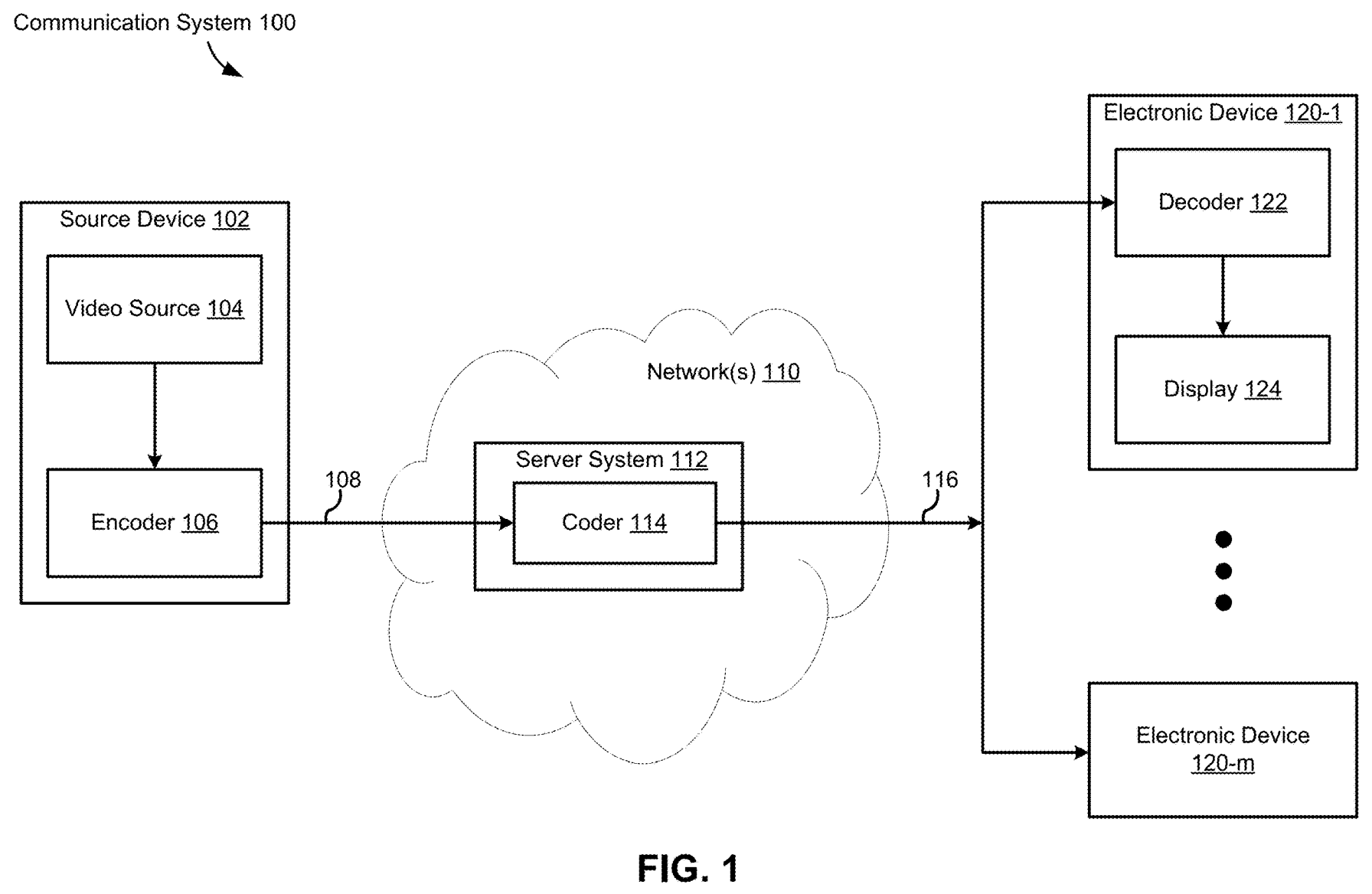

Communication System 100

Source Device 102
Video Source 104
Encoder 106

108

Network(s) 110
Server System 112
Coder 114

116

Electronic Device 120-1
Decoder 122
Display 124

Electronic Device 120-m

SPLIT_TT_HOR

SPLIT_TT_VER

SPLIT_BT_HOR

SPLIT_BT_VER

Blending matrix $W_0$          Blending matrix $W_1$

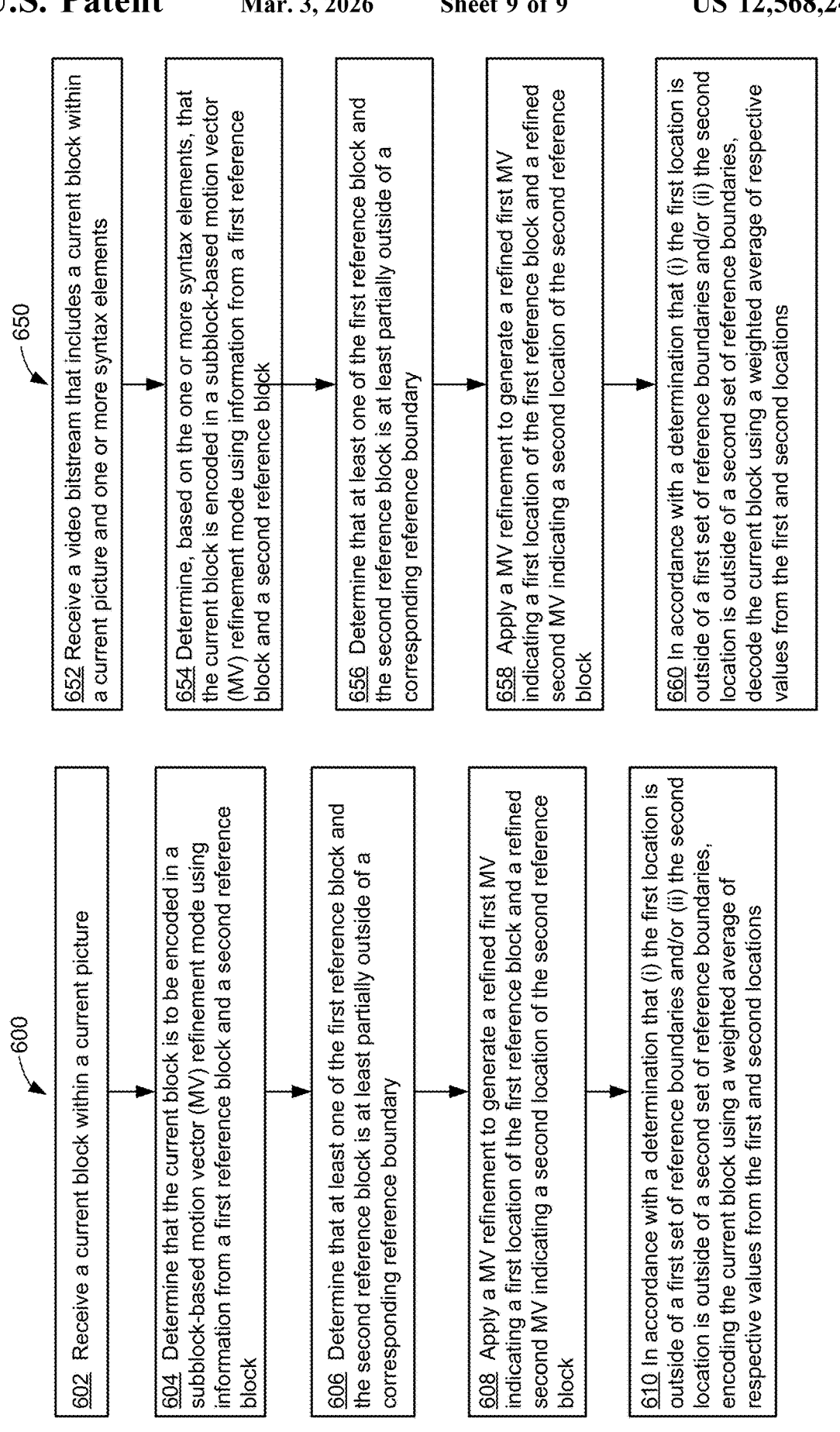

650

652 Receive a video bitstream that includes a current block within a current picture and one or more syntax elements 654 Determine, based on the one or more syntax elements, that the current block is encoded in a subblock-based motion vector (MV) refinement mode using information from a first reference block and a second reference block 656 Determine that at least one of the first reference block and the second reference block is at least partially outside of a corresponding reference boundary 658 Apply a MV refinement to generate a refined first MV indicating a first location of the first reference block and a refined second MV indicating a second location of the second reference block 660 In accordance with a determination that (i) the first location is outside of a first set of reference boundaries and/or (ii) the second location is outside of a second set of reference boundaries, decode the current block using a weighted average of respective values from the first and second locations

602 Receive a current block within a current picture

604 Determine that the current block is to be encoded in a subblock-based motion vector (MV) refinement mode using information from a first reference block and a second reference block 606 Determine that at least one of the first reference block and the second reference block is at least partially outside of a corresponding reference boundary 608 Apply a MV refinement to generate a refined first MV indicating a first location of the first reference block and a refined second MV indicating a second location of the second reference block 610 In accordance with a determination that (i) the first location is outside of a first set of reference boundaries and/or (ii) the second location is outside of a second set of reference boundaries, encoding the current block using a weighted average of respective values from the first and second locations

FIG. 6A

IMPLICIT MASKED BLENDING MODE COMBINED WITH MV REFINEMENT METHODS

RELATED APPLICATIONS

This application claims priority to U.S. Provisional Patent Application No. 63/526,890, entitled "Implicit Masked Blending Mode Combined with MV Refinement Methods," filed Jul. 14, 2023, which is hereby incorporated by reference in its entirety.

TECHNICAL FIELD

The disclosed embodiments relate generally to video coding, including but not limited to systems and methods for linear and non-linear blending of block sections in wedge-based prediction modes.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. The video coding can be performed by hardware and/or software on an electronic/client device or a server providing a cloud service.

Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality. Multiple video codec standards have been developed. For example, High-Efficiency Video Coding (HEVC/H.265) is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC/H.266) is a video compression standard intended as a successor to HEVC. ITU-T and ISO/IEC published the VVC/H.266 standard in 2020 (version 1) and 2022 (version 2). AOMedia Video 1 (AV1) is an open video coding format designed as an alternative to HEVC. On Jan. 8, 2019, a validated version 1.0.0 with Errata 1 of the specification was released.

SUMMARY

The present disclosure describes using an implicit masked blending mode (e.g., a boundary-aware compound prediction) for blending block sections that is compatible with motion vector (MV) refinement. For example, in a compound predicted block, reference blocks from the reference pictures can be at least partially out of boundary. In some systems, portions of reference block that are out of boundary are padded and thus do not reflect the real pixel values, which can result in a less accurate prediction. The disclosed methods and systems provide a more accurate reconstruction that is based on real pixel data (e.g., real pixel data is weighted more heavily), thereby improving coding accuracy (e.g., by reducing artifacts in the decoded video data) while also allowing refined MVs to be used to further improve the accuracy of compound inter prediction.

In accordance with some embodiments, a method of video decoding is provided. The method includes (a) receiving a video bitstream comprising a current block, where the current block is encoded in a subblock-based motion vector (MV) refinement mode using information from a first reference block and a second reference block: (b) determining that at least one of the first reference block and the second reference block is at least partially outside of a corresponding reference boundary: (c) deriving a refined first MV indicating a first location of the first reference block and a refined second MV indicating a second location of the second reference block; and (d) in accordance with a determination that a portion of the current block corresponds to a first area that (i) the first location is outside of a first set of reference boundaries and/or (ii) the second location is outside of a second set of reference boundaries, decoding the current block using a weighted average of respective values from the first and second locations.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and a decoder component (e.g., a transcoder component).

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for encoding and decoding video. Such methods, devices, and systems may complement or replace conventional methods, devices, and systems for video encoding/decoding.

The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

FIG. 1 is a block diagram illustrating an example communication system in accordance with some embodiments.

FIGS. 4A-4D illustrate example coding tree structures in accordance with some embodiments.

FIG. 6A is a flow diagram illustrating an example method of encoding video in accordance with some embodiments.

FIG. 6B is a flow diagram illustrating an example method of decoding video in accordance with some embodiments.

In accordance with common practice, the various features illustrated in the drawings are not necessarily drawn to scale, and like reference numerals can be used to denote like features throughout the specification and figures.

DETAILED DESCRIPTION

Figure 2A:
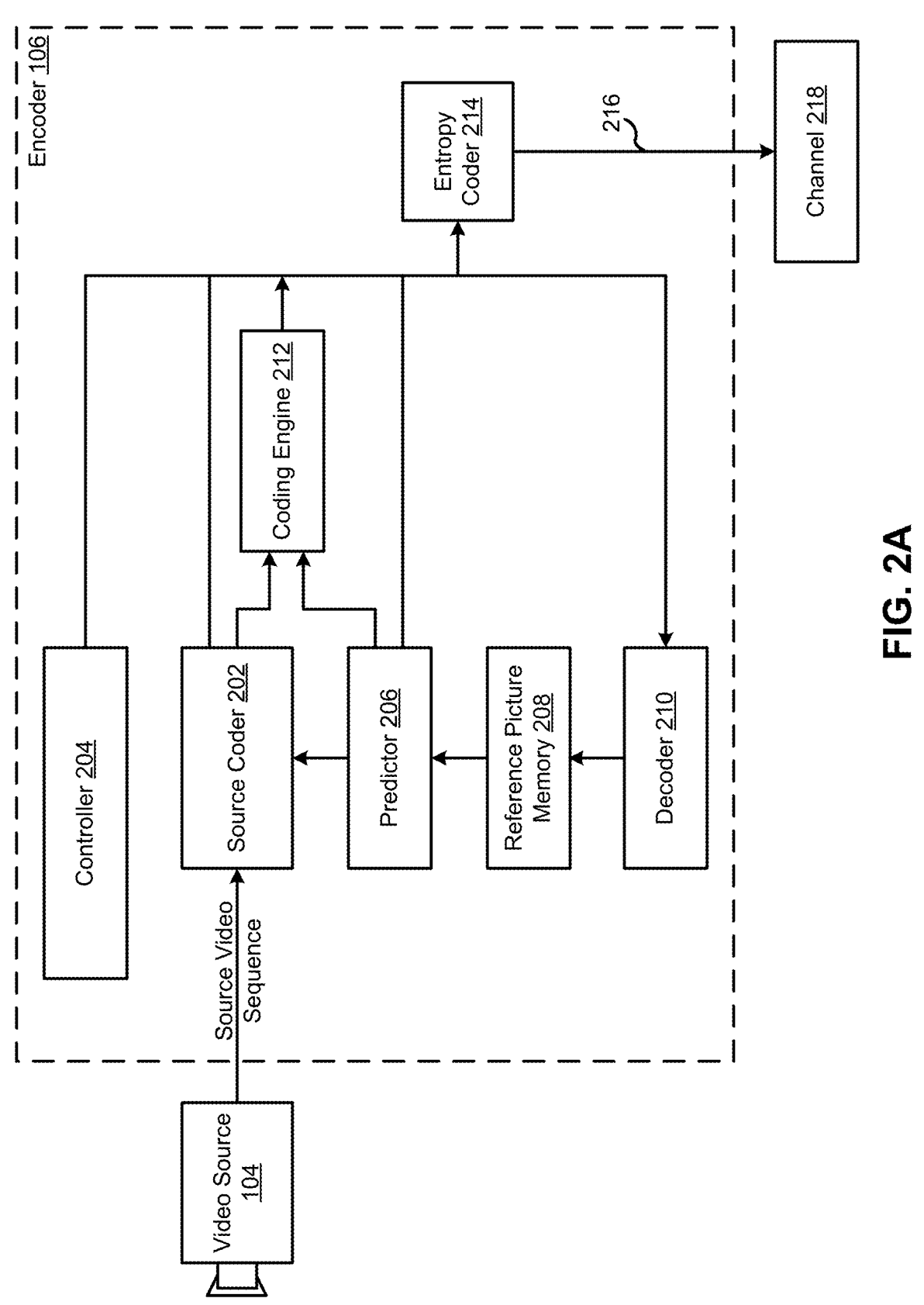
FIG. 2A is a block diagram illustrating example elements of an encoder component in accordance with some embodiments.

The present disclosure describes, among other things, using various partitioning techniques for partitioning video blocks for more optimal motion prediction and higher quality encoding. The present disclosure also describes using an implicit masked blending (e.g., a boundary-aware compound prediction) for reconstructing a current block that is encoded using information from two reference blocks via a compound mode that is compatible with motion vector (MV) refinement. As used herein, the "implicit masked blending" is a masked blending that is not explicitly signaled in a video bitstream. As described in more detail later, a compound mode can be an effective inter-prediction coding tool. Furthermore, the incorporation of an optical flow-based prediction and/or a temporal interpolated prediction (TIP) mode can amplify the capabilities of the compound mode. However, in some instances either one or both of the reference blocks extend beyond a corresponding picture boundary. In such instances, a padding may be applied to the samples outside the picture boundaries, which is suboptimal for the compound mode because the prediction is no longer based on real pixel data. The use of an implicit masked blending can improve coding accuracy (e.g., reducing artifacts in the decoded video data) of the compound mode by providing a more accurate reconstruction that is based on real pixel data (e.g., real pixel data is weighted more heavily) compared to current designs in which the out-of-boundary portions of reference blocks are padded and do not reflect the real pixel values, while also allowing refined MVs to be used to further improve the accuracy of compound inter prediction.

Example Systems and Devices

FIG. 1 is a block diagram illustrating a communication system 100 in accordance with some embodiments. The communication system 100 includes a source device 102 and a plurality of electronic devices 120 (e.g., electronic device 120-1 to electronic device 120-m) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108. In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 to recover and optionally display the video pictures.

FIG. 2A is a block diagram illustrating example elements of the encoder component 106 in accordance with some embodiments. The encoder component 106 receives a source video sequence from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any color-space (e.g., BT.601 Y CrCB, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples. The description below focuses on samples.

The encoder component 106 is configured to code and/or compress the pictures of the source video sequence into a coded video sequence 216 in real-time or under other time constraints as required by the application. Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture (s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding. This principle of reference picture synchronicity (and resulting drift, if synchronicity cannot be maintained, for example because of channel errors) is known to a person of ordinary skill in the art.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

The decoder technology described herein, except the parsing/entropy decoding, may be to be present, in substantially identical functional form, in a corresponding encoder. For this reason, the disclosed subject matter focuses on decoder operation. The description of encoder technologies can be abbreviated as they may be the inverse of the decoder technologies.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata, such as reference picture motion vectors and block shapes, that may serve as an appropriate prediction reference for the new pictures. The predictor 206 may operate on a sample block-by-pixel block basis to find appropriate prediction references. In some cases, as determined by search results obtained by the predictor 206, an input picture may have prediction references from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
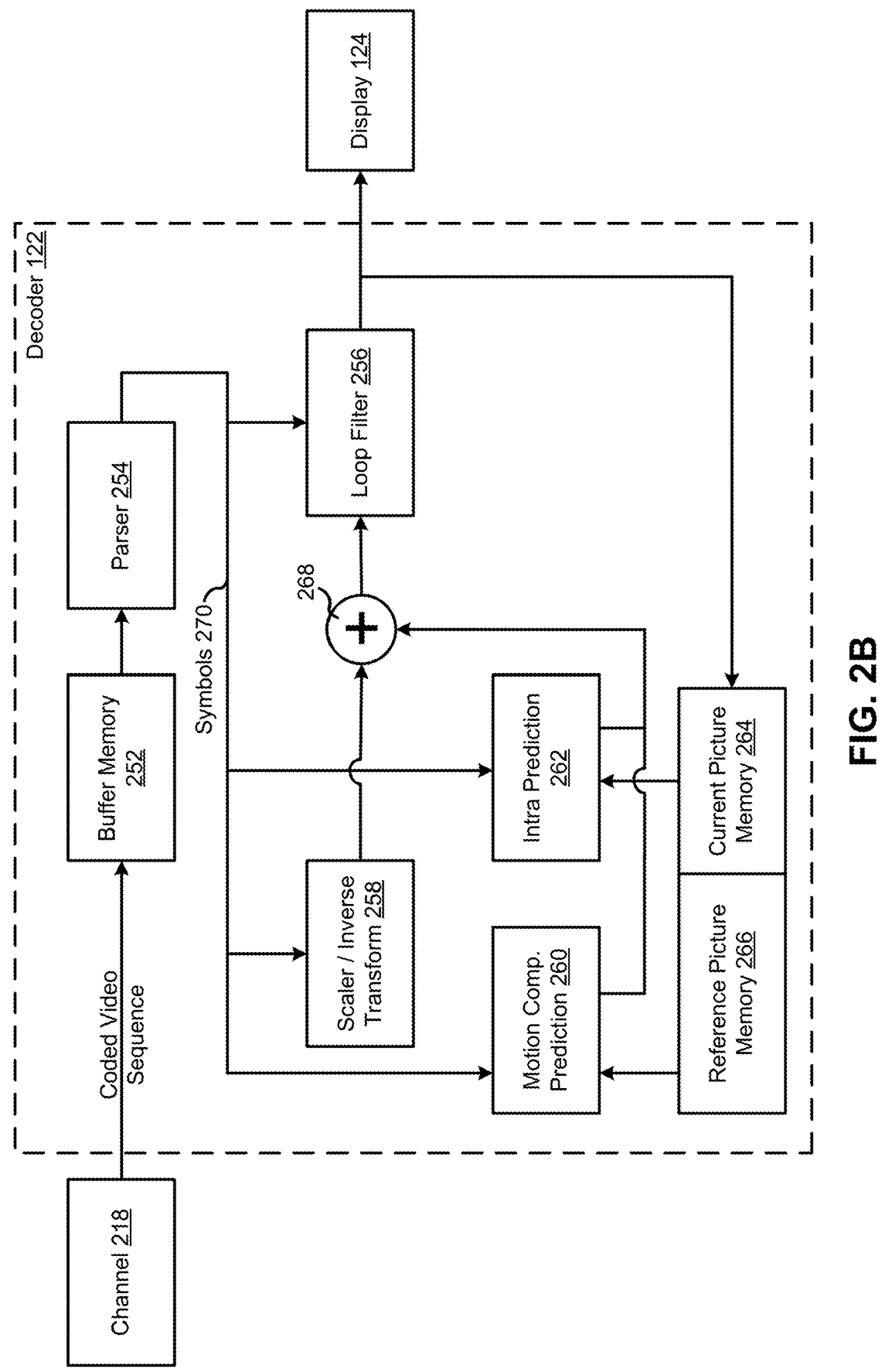
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, for example, temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. In some embodiments, the decoder component 122 is implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and can be advantageously of adaptive size, and may at least partially be implemented in an operating system or similar elements (not depicted) outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

The decoder component 122 can be conceptually subdivided into a number of functional units, and in some implementations, these units interact closely with each other and can, at least partly, be integrated into each other. However, for clarity, the conceptual subdivision of the functional units is maintained herein.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268.

In some cases, the output samples of the scaler/inverse transform unit 258 pertain to an intra coded block: that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation also can include interpolation of sample values as fetched from the reference picture memory 266 when sub-sample exact motion vectors are in use, motion vector prediction mechanisms, and so forth.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values.

The output of the loop filter unit 256 can be a sample stream that can be output to a render device such as the display 124, as well as stored in the reference picture memory 266 for use in future inter-picture prediction.

Certain coded pictures, once reconstructed, can be used as reference pictures for future prediction. Once a coded picture is reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
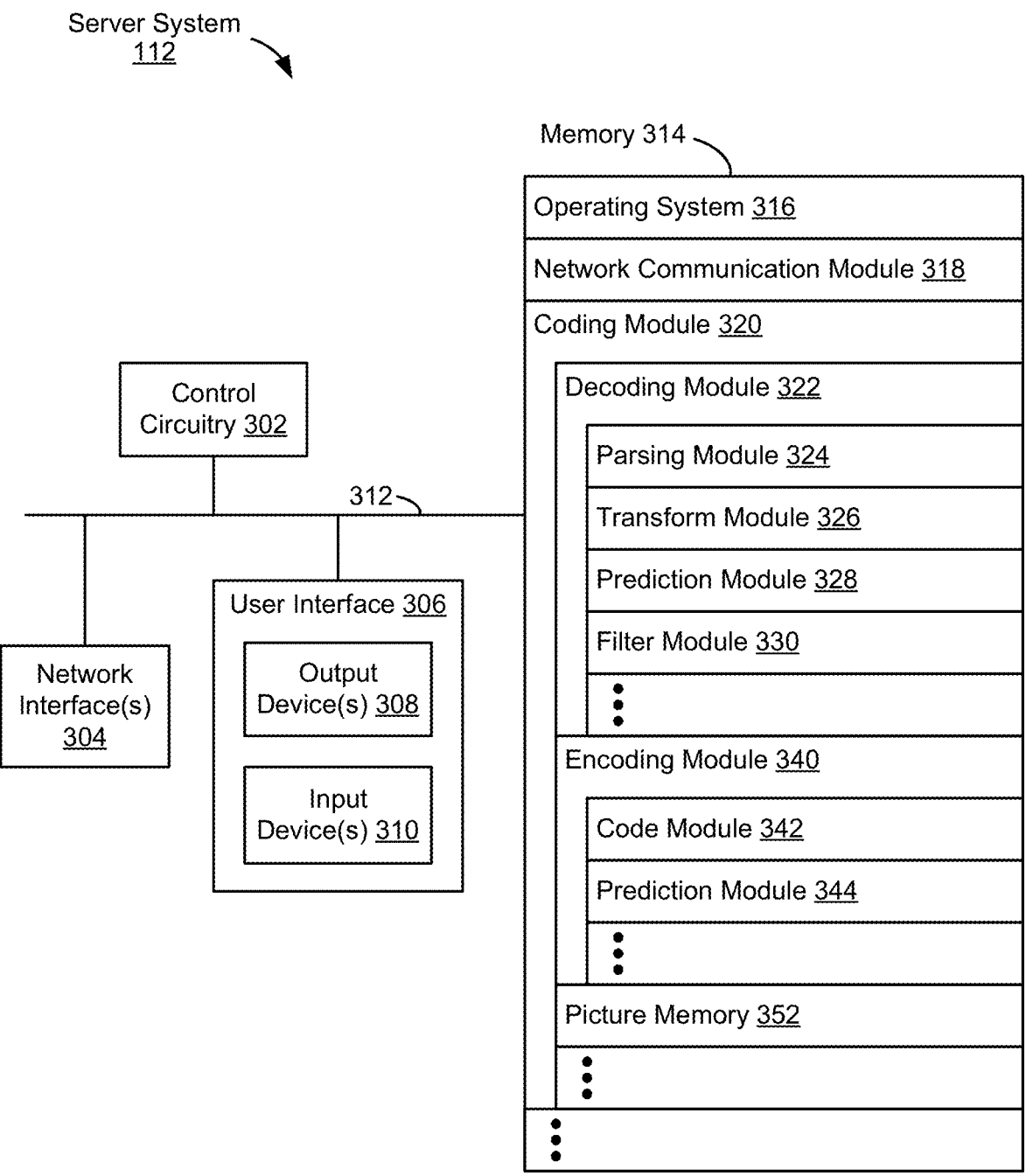
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes one or more field-programmable gate arrays (FPGAs), hardware accelerators, and/or one or more integrated circuits (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
  - a decoding module 322 for performing various functions with respect to decoding encoded data, such as those described previously with respect to the decoder component 122; and
  - an encoding module 340 for performing various functions with respect to encoding data, such as those described previously with respect to the encoder component 106; and
- a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above, such as an audio processing module.

Although FIG. 3 illustrates the server system 112 in accordance with some embodiments, FIG. 3 is intended more as a functional description of the various features that may be present in one or more server systems rather than a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Example Coding Processes and Techniques

Figures 4A, 4B, 4C, 4D:
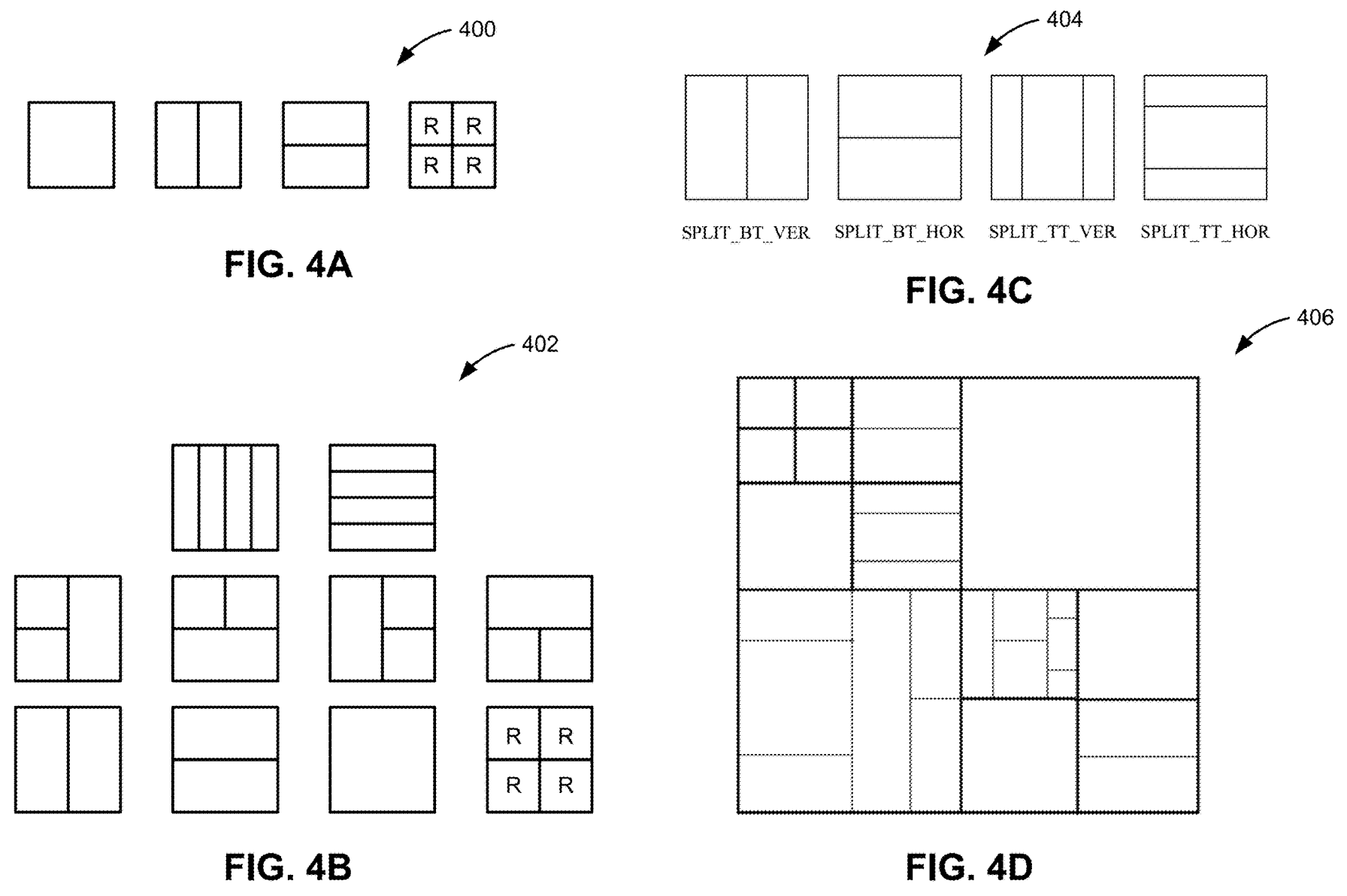

The coding processes and techniques described below may be performed at the devices and systems described above (e.g., the source device 102, the server system 112, and/or the electronic device 120). FIGS. 4A-4D illustrate example coding tree structures in accordance with some embodiments. As shown in a first coding tree structure (400) in FIG. 4A, some coding approaches (e.g., VP9) use a 4-way partition tree starting from a 64×64 level down to a 4×4 level, with some additional restrictions for blocks 8×8. In FIG. 4A, partitions designated as R can be referred to as recursive in that the same partition tree is repeated at a lower scale until the lowest 4×4 level is reached.

As shown in a second coding tree structure (402) in FIG. 4B, some coding approaches (e.g., AV1) expand the partition tree to a 10-way structure and increase the largest size (e.g., referred to as a superblock in VP9/AV1 parlance) to start from 128×128. The second coding tree structure includes 4:1/1:4 rectangular partitions that are not in the first coding tree structure. The partition types with 3 sub-partitions in the second row of FIG. 4B are referred to as T-type partitions. In addition to a coding block size, coding tree depth can be defined to indicate the splitting depth from the root note.

As an example, a CTU may be split into CUs by using a quad-tree structure denoted as a coding tree to adapt to various local characteristics, such as in HEVC. In some embodiments, the decision on whether to code a picture area using inter-picture (temporal) or intra-picture (spatial) prediction is made at the CU level. Each CU can be further split into one, two, or four PUs according to the PU splitting type. Inside one PU, the same prediction process is applied, and the relevant information is transmitted to the decoder on a PU basis. After obtaining the residual block by applying the prediction process based on the PU splitting type, a CU can be partitioned into TUs according to another quad-tree structure like the coding tree for the CU.

A quad-tree with nested multi-type tree using binary and ternary splits segmentation structure, such as in VVC, may replace the multiple partition unit types, e.g., removes the separation of the CU, PU, and TU concepts except as needed for CUs that have a size too large for the maximum transform length, and supports more flexibility for CU partition shapes. In the coding tree structure, a CU can have either a square or rectangular shape. A CTU is first partitioned by a quaternary tree (also referred to as quad-tree) structure. The quaternary tree leaf nodes can be further partitioned by a multi-type tree structure. As shown in a third coding tree structure (404) in FIG. 4C, the multi-type tree structure includes four splitting types. The multi-type tree leaf nodes are called CUs, and unless the CU is too large for the maximum transform length, this segmentation is used for prediction and transform processing without further partitioning. Thus, in most cases, the CU, PU, and TU have the same block size in the quad-tree with nested multi-type tree coding block structure. An example of block partitions for one CTU (406) is shown in FIG. 4D, which illustrates an example quadtree with nested multi-type tree coding block structure.

Motion estimation involves determining motion vectors that describe the transformation from one image (picture) to another. The reference image (or block) can be from an adjacent frame in a video sequence. The motion vectors may relate to the whole image (global motion estimation) or a particular block. Additionally, the motion vectors can correspond to a translational or warped model that approximates the motion (e.g., rotation and translation in three dimensions and zoom). Motion estimated can be improved in some circumstances (e.g., with more complicated video objects) by further partitioning the blocks.

A geometric partitioning mode (GPM) may focus on inter-picture predicted blocks (e.g., CUs). When GPM is applied to a block, the block is split into two parts via a straight partitioning boundary. The location of the partitioning boundary may be mathematically defined by an angle parameter $\varphi$ and an offset parameter $\rho$. These parameters may be quantized and combined into a GPM partitioning index lookup table. The GPM partitioning index of the current block may be coded into the bitstream. For example, 64 partitioning modes are supported by GPM in VVC for a CU with a size of w×h=2k×2l (in terms of luma samples) with k, l∈{3 ... 6}. GPM may be disabled on a CU that has an aspect ratio larger than 4:1 or smaller than 1:4, e.g., because narrow CUs rarely contain geometrically separated patterns.

After partitioning, the two GPM sections (partitions) contain individual motion information that can be used to predict the corresponding sections in the current block. In some embodiments, only a unidirectional motion-compensated prediction (MCP) is allowed for each section of the GPM so that the required memory bandwidth for MCP in the GPM is equal to that for the regular bidirectional MCP. To simplify the motion information coding and reduce the possible combinations for the GPM, the motion information can be coded with merge mode. The GPM merge candidate list can be derived from the merge candidate list, to ensure that only unidirectional motion information is contained.

Figure 5A:
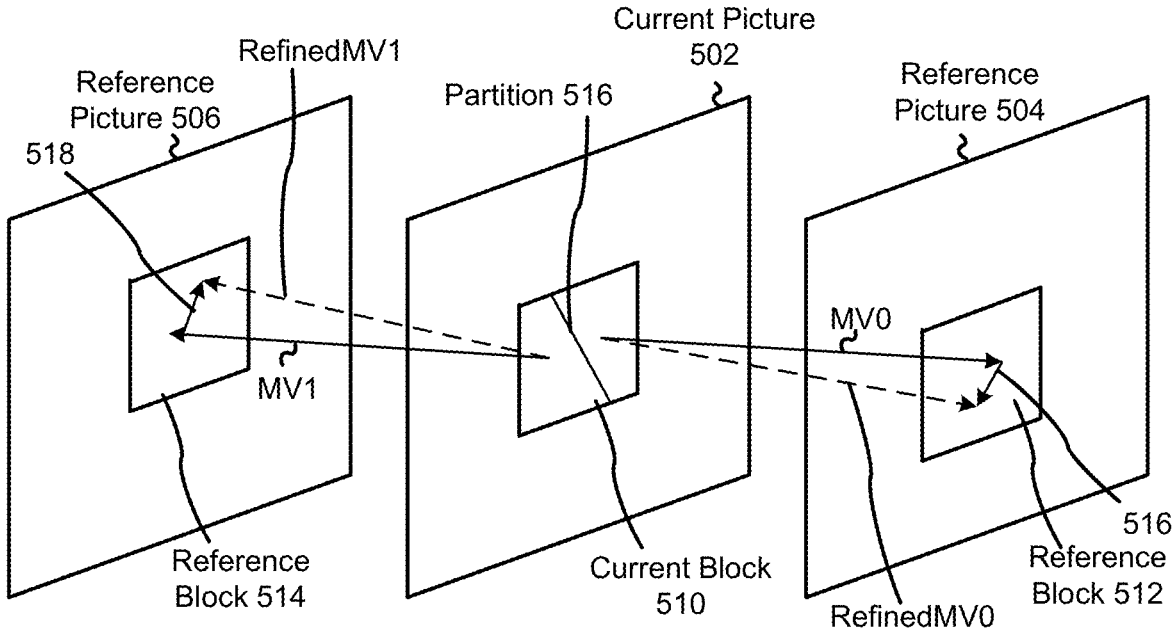
FIG. 5A shows an example of a partition-based prediction mode, including refinement of motion vectors, in accordance with some embodiments.

FIG. 5A illustrates a prediction process of GPM in accordance with some embodiments. A current block 510 is partitioned into a right-side section and a left-side section via a partition 516. The right-side predicted part of the current block 510 (e.g., a CU) of a current picture 502 (e.g., with a size of w×h) is predicted by MV0 from reference block 512 of reference picture 504, whereas the left-side part is predicted by MV1 from reference block 514 of reference picture 506. In some embodiments, MVs of the blocks are refined before implicit masked blending, described below, is applied. For each block or sub-block, an offset motion vector, ΔMV (e.g., offset 516 and offset 518 in FIG. 5A) is derived by searching neighboring areas of initial motion vectors MV0 and MV1. For example, the decoder searches a predefined area (e.g., a 5×5 area) with center at the initial motion vectors and selects the offset which produces the minimum sum of absolute values (SAD) between P0 and P1. For example, the selected offset is added to MV0 and subtracted from MV1. In some embodiments, only integer offsets are searched. The refined MV (e.g., RefinedMV0 and RefinedMV1 in FIG. 5A) are indicated in FIG. 5A with dashed lines. For example, the refined MV is the output (e.g., the last output) from an MV refinement process. In some embodiments, an intermediate MV is computed prior to calculating the final MV. In some embodiments, one or more syntax elements (e.g., a block level ON/OFF flag such as refinemev_flag) are conditionally signaled. For example, the flag is context coded and the context is dependent on the block size (e.g., block size is larger than 8×8 block). In some embodiments, the refinement process is enabled for bidirectional compound mode for two reference pictures that are equidistant from the current picture. In some embodiments, if the refinemev_flag is not signaled to the bitstream and it is inferred to be 0.

Figure 5B:
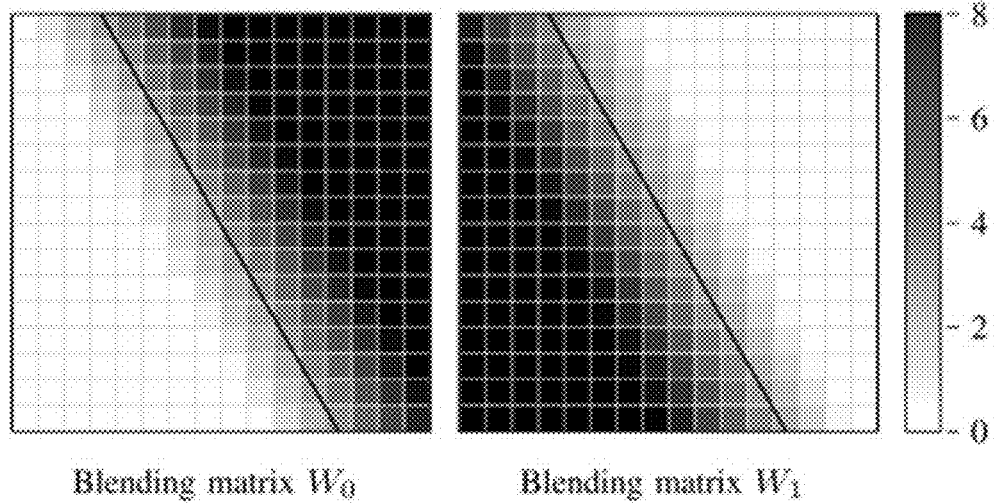
FIGS. 5B-5C show example partitioning mode blendings in accordance with some embodiments.

In some embodiments, when a current block is split into two partitions via a partition (e.g., the partition 516), blending (e.g., corresponding to a "blending mode" or "masked blending") is applied to combine the two partitioned blocks. Blending the partitions involves applying a weighted sum of the predictions for each partition. FIG. 5B illustrates example blending matrices for a partition (e.g., the partition 516) in accordance with some embodiments. In this example, a final GPM prediction (PG) is generated by performing a blending process using integer blending matrices W0 and W1, e.g., containing weights in the value range of 0 to 8. This can be expressed as:

$$PG = (W0 \circ P0 + W1 \circ P1 + 4) \gg 3 \qquad \text{Equation 1}$$

$$\text{with } W0 + W1 = 8J$$

Blended Prediction

In Equation 1, J is a matrix of ones with a size of w×h. The weights of the blending matrix may depend on the displacement between the sample location and the partitioning boundary. The computational complexity of blending matrices derivation can be low, so that these matrices can be generated on-the-fly at the decoder side.

The generated GPM prediction (PG) can then be subtracted from the original signal to generate the residuals. The residuals may be transformed, quantized, and coded into the bitstream, e.g., using the regular VVC transformation, quantization, and entropy coding engines. At the decoder side, the signal is reconstructed by adding the residuals to the GPM prediction PG. A skip mode can also be supported by GPM, e.g., when the residuals are negligible. For example, the residual is dropped by the encoder, and the GPM prediction PG is directly used by the decoder as the reconstructed signal.

Figure 5C:
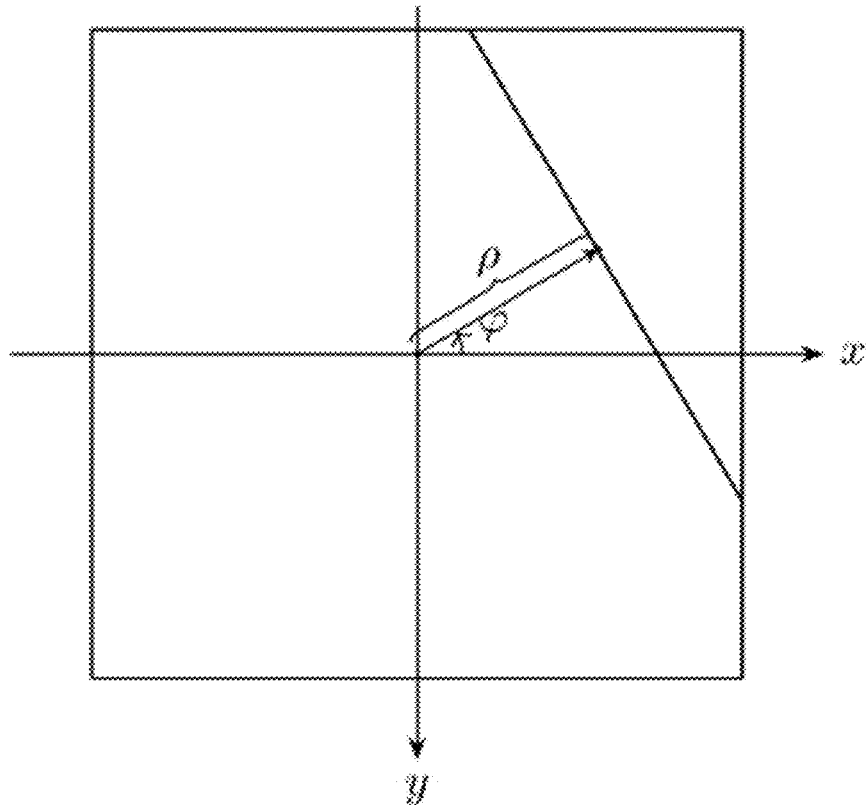
Figure 5D:
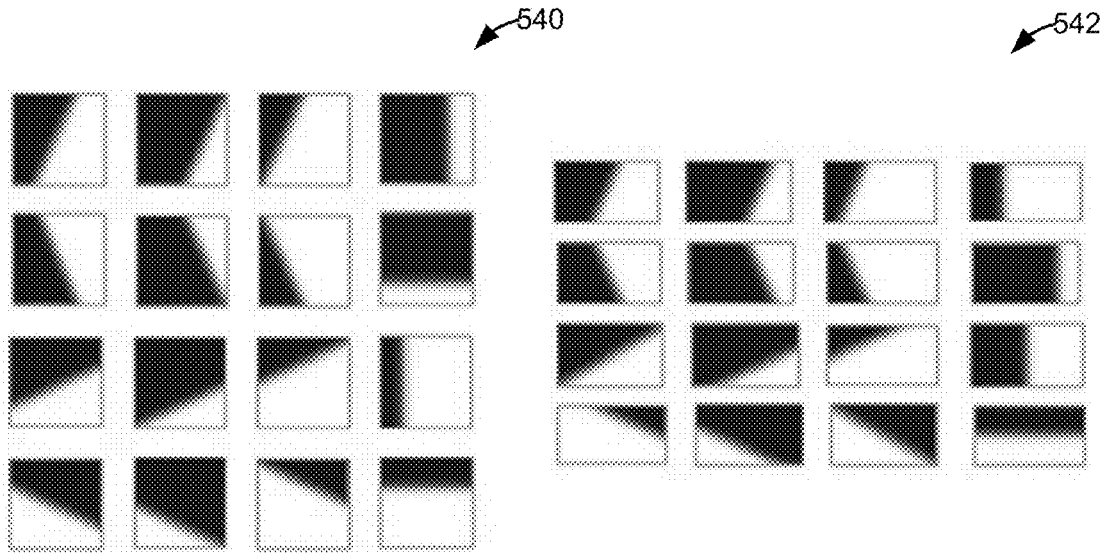
FIG. 5D shows example wedge-based partitioning in accordance with some embodiments.

Wedge-based prediction is one example of a blending mode. Wedge-based prediction is a compound prediction mode (e.g., in AV1), which is similar to GPM. The wedge-based prediction can be used for both inter-inter and inter-intra combinations. Boundaries of moving objects are often difficult to approximate by on-grid block partitions. A solution is to predefine a codebook of possible wedge partitions (e.g., 16) and to signal the wedge index in the bitstream when a coding unit is to be further partitioned in such a way. In the current wedge design in AV1, 16 modes are supported because a maximum 16 symbols can be signaled in one syntax element with the multi-symbol adaptive context coding used in AV1. The 16-ary shape codebooks containing partition orientations that are either horizontal, vertical, or oblique (e.g., with slopes ±2 or ±0.5) are designed for both square blocks 540 and rectangular blocks 542 as shown in FIG. 5D. To mitigate spurious high-frequency components, which often are produced by directly juxtaposing two predictors, soft-cliff-shaped 2-D wedge masks may be employed to smooth the edges around the intended partition (e.g., m (i, j) is close to 0.5 around the edges and gradually transforms into binary weights at either end).

The wedge modes in AV1 may be extended to allow for wedge modes to be used for 64×64, 32×64, 64×32, 16×64, and 64×16 blocks. Additionally, the wedge modes may be defined in the Hessian norm form, as illustrated in FIG. 5C, where an angle q indicates the direction of the split boundary, and a distance p indicates the offset of the split boundary from the center of a block. The angles may be quantized into values (e.g., 20 values) using tangent values. The distances may be quantized based on block sizes. For example, three distances may be used for angles larger than or equal to 180 degrees, and for 0-degree or 90-degree angles. Four distances may be used for the other angles. In this way, 8×4+12×3=68 modes may be supported. Because more than 16 modes are supported, the wedge index may be signaled with three syntax elements, e.g., the angle direction, angle, and distance. The angle direction indicates whether the angle is smaller than 180 degrees. Depending on the angle direction, the actual angle may be signaled. Depending on the signaled angles, the distance may be signaled.

The wedge blending mask may be quantized directly from the distance between a sample position to the split boundary. Using the Hessian norm form split boundary definition, the distance can be defined as:

$$d(x, y) = x\cos(\varphi) - y\sin(\varphi) + \rho \qquad \text{Equation 2}$$

Blending Mask Distances where $\rho$ is the distance from the center and $\varphi$ is the partition angle. The angles and distances may be quantized by using tangent values and block sizes. Therefore, lookup tables and shift operations may be used to calculate the quantized d(m, n) as shown below in Equation 3.

$$d(m, n) = (((m + \rho_x) \ll 1) - w + 1)\cos LUT[\varphi_i] + \qquad \text{Equation 3}$$

$$(((n + \rho_y) \ll 1) - h + 1)\sin LUT[\varphi_i]$$

Quantized Distances

The blending weight at a corresponding location may be derived using Equation 4:

$$\omega_{m,n} = \text{clamp}(0, 64, (d(m, n) + 32)) \qquad \text{Equation 4}$$

Blending Weights

The blending weights may be computed on the fly (e.g., because the computational complexity is low), or prestored (e.g., as with the AV1 wedge mode design).

Figure 5E:
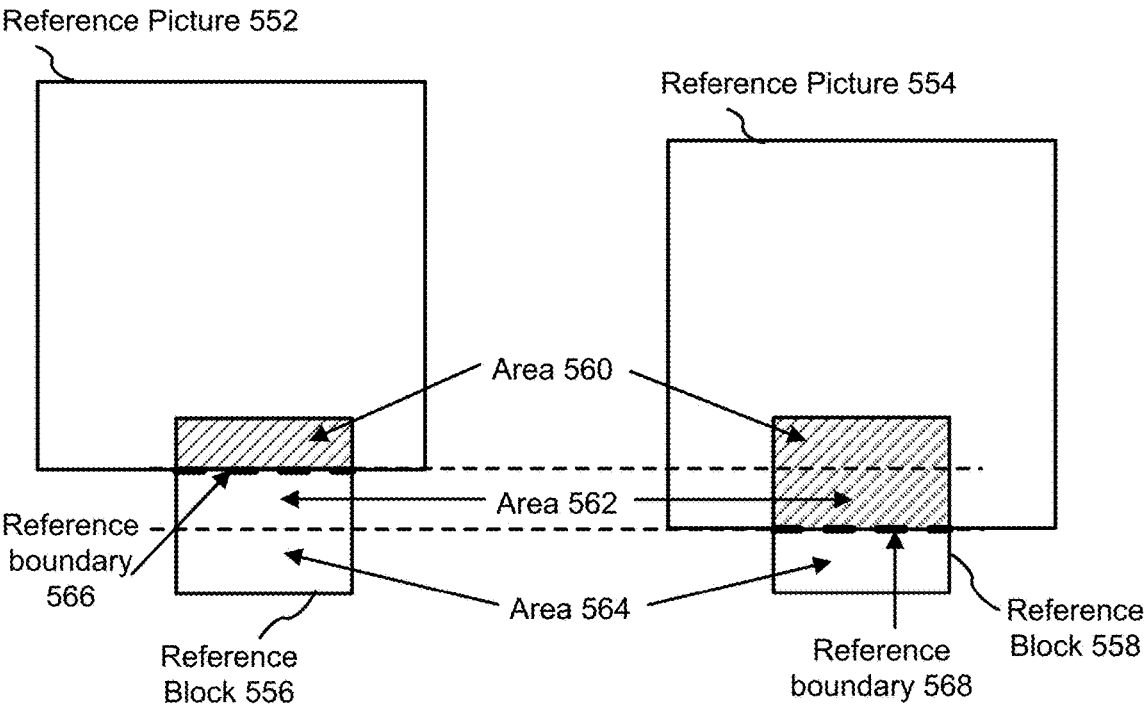
FIGS. 5E-5F illustrate example scenarios where a reference block is at least partially outside a corresponding reference picture boundary in accordance with some embodiments.
Figure 5F:
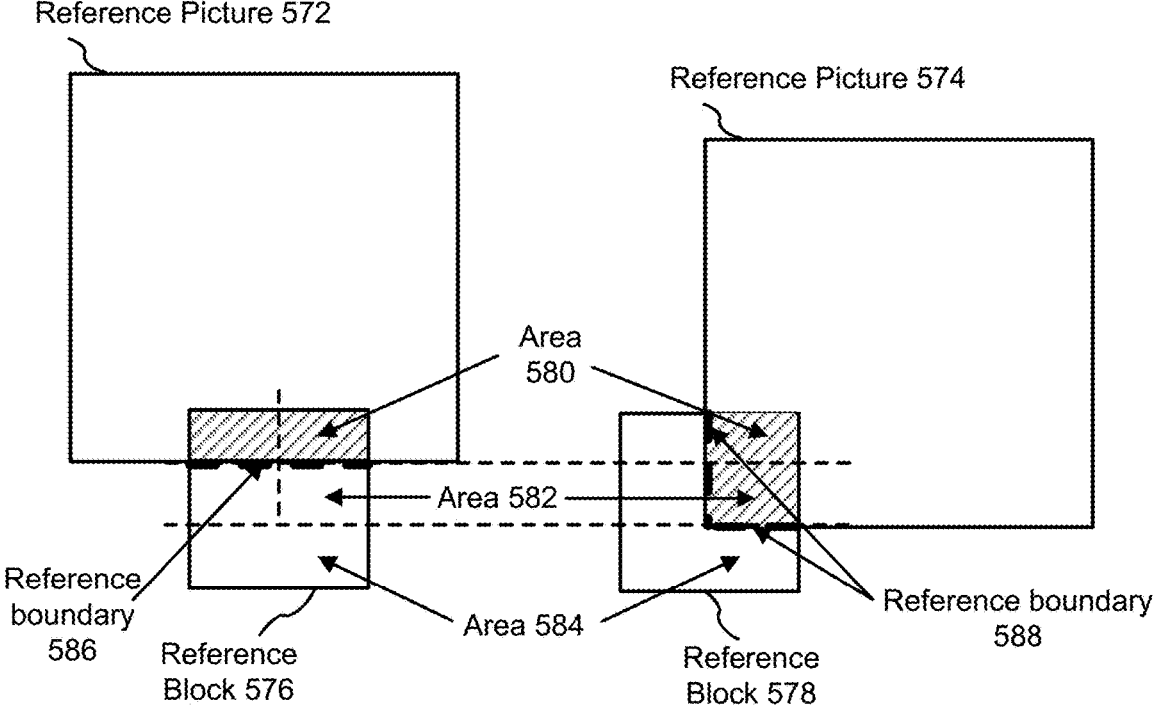

In some embodiments, a compound predicted block is predicted by two or more reference blocks, each having a respective corresponding reference picture. Some current systems use a simple average or a weighted average to combine values from the two reference blocks to generate the compound predicted block. In some instances, at least one of the reference blocks is at least partially out of boundary. FIGS. 5E and 5F illustrate example scenarios in which a compound predicted block is predicted using reference blocks that are partially out-of-boundary, in accordance with some embodiments. In FIG. 5E, a compound predicted block is predicted using values from reference block 556 of reference picture 552 and values from reference block 558 of reference picture 554. The shaded area of the reference block 556 is within a corresponding reference boundary 566 (e.g., a reference picture boundary) whereas the non-shaded area of the reference block 556 is outside the corresponding reference boundary 566. The shaded area of the reference block 558 is within a corresponding reference boundary 568 whereas the non-shaded area of the reference block 556 is outside the corresponding reference boundary 568. In FIG. 5F, a compound predicted block is predicted using values from reference block 576 of reference picture 572 and values from reference block 578 of reference picture 574. The shaded area of the reference block 576 is within a corresponding reference boundary 586 whereas the non-shaded area of the reference block 576 is outside the corresponding reference boundary 586. The shaded area of the reference block 578 is within a corresponding reference boundary 588 whereas the non-shaded area of the reference block 578 is outside the corresponding reference boundary 588. In some current systems, the out-of-boundary portion (s) of the reference block are padded and thus do not reflect the actual pixel values, which can result in a less accurate prediction.

In some embodiments, as illustrated in reference block 556 and reference block 558 in FIG. 5E (or reference block 576 and reference block 578 in FIG. 5F, in which the reference block 578 is at a corner of the reference picture 574), the shaded areas of the reference blocks are inside the respective boundaries of the corresponding reference pictures (e.g., reference picture 552 and reference picture 554), whereas the nonshaded areas are outside the respective boundaries of the corresponding reference pictures. In some embodiments, an area common to both the reference block 556 and the reference block 558 that is inside the respective reference boundary (e.g., area 560) is herein referred to as a "both inside" area. In some embodiments, an area that comprises (a) one reference block inside the respective reference boundary and (b) the other reference block outside the respective reference boundary (e.g., area 562) is referred to herein as the "one side in and one side out" area. In some embodiments, an area common to both the reference block 556 and the reference block 558 that is outside the respective reference boundary (e.g., area 564) is herein referred to as a "both outside" area.

In some embodiments, an implicit mask is generated in accordance with a determination that at least one predictor of a compound mode is partially or fully out of a corresponding picture boundary. In some embodiments, a mask is generated using the example code snippet below and a masked compound mode is applied.

$$x_0 = x + mv0_x; \; y_0 = y + mv0_y; \; x_1 = x + mv1_x; \; y_1 = y + mv1_y$$

-continued $$\text{is\_P}_{(x_0, y_0)\_}\text{out} = x_0 < 0 \text{ or } x_0 \geq \text{frame\_width or}$$

$$y_0 < 0 \text{ or } y_0 \geq \text{frame\_height}$$

$$\text{is\_P}_{(x1, y1)\_}\text{out} = x_1 < 0 \text{ or } x_1 \geq \text{frame\_width or}$$

$$y_1 < 0 \text{ or } y_1 \geq \text{frame\_height}$$

$$\text{if } \left( ! \; \text{is\_P}_{(x_0, y_0)\_}\text{out and is\_P}_{(x1, y1)\_}\text{out}\right) m(x, y) = 63$$

$$\text{else if } \left(\text{is\_P}_{(x_0, y_0)\_}\text{out and } ! \; \text{is\_P}_{(x1, y1)\_}\text{out}\right) m(x, y) = 1$$

$$\text{else } m(x, y) = 32$$

where (x,y) denotes the sample position in picture coordinates; is\_P$_{(x0,y0)}$\_out and is\_P$_{(x1,y1)}$\_out are variables indicating whether the samples at $(x_0, y_0)$ and $(x_1, y_1)$ are located outside of the corresponding picture boundaries; and m(x,y) denotes the weighting factor at (x,y) of the generated mask.

In some embodiments, a predictor P (x,y) is generated for the masked compound mode as shown in Equation 5.

$$P(x, y) = \qquad\qquad\qquad \text{Equation 5}$$
$$\text{clip}((m(x, y) * P_0(x, y) + (64 - m(x, y)) * P_1(x, y) + 32) \gg 6)$$

Compound mode predictor

In some embodiments, the implicit mask generation process described above is applied to a compound mode, an optical-flow-based compound mode, and/or a temporal interpolated prediction (TIP) mode. In some embodiments, for optical-flow (including the optical flow for TIP) mode, the implicit mask generation process is only applied to the final predicted signal after a refinement process, and not involved during the refinement.

An example code snippet includes a function for MV refinement, such as "build_inter_predictors_8×8_and_bigger_refinemv( )", that includes a flag "use_bacp" which is enabled after MV refinement (e.g., "apply_mv_refinement") has been performed. For example, the "use_bacp" flag is used to indicate whether a boundary-aware compound prediction (e.g., "bacp" or implicit blending mode) is enabled. For example, when use_bacp equals to 1, the implicit masked blending mode is enabled, whereas when use_bacp equals to 0), the implicit masked blending mode is disabled. In some embodiments, apply_mv_refinement is an intermediate motion compensation (e.g., "intermediate mc") and does not involve any implicit masked blending. After motion compensation (e.g., intermediate and/or final) has been applied, the flag "use_bacp" is enabled. For example, the implicit masked blending is not enabled until after MV refinement has been completed.

The methods and processes described below detail an implicit masked blending mode. In accordance with some embodiments, the implicit masked blending mode is implemented when at least a portion of a reference block used to predict a current block is outside a corresponding boundary (e.g., a reference picture boundary). The implicit masked blending mode may be used with the GPM and/or wedge-based prediction processes described previously. Turning now to some example embodiments.

FIG. 6A is a flow diagram illustrating a method 600 of encoding video in accordance with some embodiments. The method 600 may be performed at a computing system (e.g., the server system 112, the source device 102, or the electronic device 120) having control circuitry and memory storing instructions for execution by the control circuitry. In some embodiments, the method 600 is performed by executing instructions stored in the memory (e.g., the memory 314) of the computing system. The system receives (602) a current block within a current picture. The system determines (604) that the current block is to be encoded in a subblock-based motion vector (MV) refinement mode using information from a first reference block and a second reference block. The system determines (606) that at least one of the first reference block and the second reference block is at least partially outside of a corresponding reference boundary. The system applies a MV refinement process to generate (608) a refined first MV indicating a first location of the first reference block and a refined second MV indicating a second location of the second reference block. Subsequent to applying the MV refinement process, in accordance with a determination that a portion of the current block corresponds to a first area that (i) the first location is outside of a first set of reference boundaries (e.g., the Area 562, the Area 564 in FIG. 5E) and/or (ii) the second location is outside of a second set of reference boundaries (e.g., the Area 562, the Area 564 in FIG. 5E), the system encodes (610) the current block using a weighted average of respective values from the first and second locations. In some instances, a weight w1 for a first location that is outside of a first set of reference boundaries is equal to 1 and a weight w2 for a second location that is inside of a second set of reference boundaries is equal to 63 (or 31).

FIG. 6B is a flow diagram illustrating a method 650 of decoding video in accordance with some embodiments. The method 650 may be performed at a computing system (e.g., the server system 112, the source device 102, or the electronic device 120) having control circuitry and memory storing instructions for execution by the control circuitry. In some embodiments, the method 650 is performed by executing instructions stored in the memory (e.g., the memory 314) of the computing system. The system receives (652) a video bitstream comprising a current block within a current picture, and one or more syntax elements. The system determines (654), based on the one or more syntax elements in the video bitstream, that the current block is encoded in a subblock-based motion vector (MV) refinement mode using information from a first reference block and a second reference block. The system determines (656) that at least one of the first reference block and the second reference block is at least partially outside of a corresponding reference boundary. The system applies a MV refinement process to generate (658) a refined first MV (e.g., RefinedMV0 in FIG. 5A) indicating a first location of the first reference block and a refined second MV (e.g., RefinedMV1 in FIG. 5A) indicating a second location of the second reference block. Subsequent to applying the MV refinement process, in accordance with a determination that a portion of the current block corresponds to a first area that (i) the first location is outside of a first set of reference boundaries (e.g., the Area 562, the Area 564 in FIG. 5E) and/or (ii) the second location is outside of a second set of reference boundaries (e.g., the Area 562, the Area 564 in FIG. 5E), the system decodes (660) the current block using a weighted average of respective values from the first and second locations. In some instances, a weight w1 for a first location that is outside of a first set of reference boundaries is equal to 1 and a weight w2 for a second location that is inside of a second set of reference boundaries is equal to 63 (or 31).

Although FIGS. 6A and 6B illustrates a number of logical stages in particular orders, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

In some embodiments, as illustrated by reference block 556 and reference block 558 in FIG. 5E (or reference block 576 and reference block 578 in FIG. 5F, in which the reference block 578 is at a corner of the reference picture 574), the shaded areas of the reference blocks are inside the respective boundaries of the corresponding reference pictures (e.g., reference picture 552 and reference picture 554), whereas the nonshaded areas are outside the respective boundaries of the corresponding reference pictures.

In some embodiments, a block and/or a sample is encoded using information from a first reference block (e.g., reference block 556) and a second reference block (e.g., reference block 558). In some embodiments, a mask can be generated depending on whether the block position and/or sample position corresponds to an area that is inside or outside a respective picture boundary of the first and second reference blocks. In some embodiments, the block and/or sample is reconstructed using averaged weighting (e.g., equal weights). In some embodiments, the block and/or sample is reconstructed using non-averaged weighting. For example, weighting factors such as 0:64 or 1:63 may be used for samples which are located outside of the picture boundary.

In some embodiments, different weighting schemes are used based on the reference sample positioning. For example, the weighting scheme may be based on whether the block position and/or sample position corresponds to an area that is within the corresponding reference boundaries in both of the first and second reference blocks, or the block position and/or sample position corresponds to an area that is not within the corresponding reference boundaries in both of the first and second reference blocks, or the block position and/or sample position corresponds to an area that is within the corresponding reference boundaries in only one of the first and second reference blocks.

In some embodiments, an area common to both the reference block 556 and the reference block 558 that is inside the respective reference boundary (e.g., area 560) or an area common to both the reference block 556 and the reference block 558 that outside the respective reference boundary (e.g., area 564) is averaged using a simple average (e.g., an unweighted average). In some embodiments, an area that comprises (a) one reference block inside the respective reference boundary and (b) the other reference block outside the respective reference boundary (e.g., area 562) is combined using implicit masked weighting.

In some embodiments, the weighting factors are fixed and the sum of the weighting factors equals a value of 2 to the power of n. For example, the weighting factor for a first predictor, P0 (e.g., corresponding to reference block 556), may be denoted as w1. The weighting factor for a second predictor, P1 (e.g., corresponding to reference block 558), may be denoted as w2. In some instances (e.g., where P1 is inbounds and P0 is out of bounds), w1 is equal to 0 and w2 is equal to 64 (or 32), which means only P1 (e.g., reference block 556) is used as the compound predictor. In some instances (e.g., where P1 is inbounds and P0 is out of bounds), w1 equals to 1 and w2 equals to 63 (or 31), which means P1 (e.g., reference block 556) is more important; however, the padded values provided by P0 (e.g., reference block 558) are still used.

In some embodiments, multiple fixed weighing factor values are predefined, and the index of the best factor value (e.g., the lowest cost factor value and/or the factor value that results in the most accurate reconstruction) is signaled in the high-level syntax (e.g., in a picture or tile header)

In some embodiments, the weighting factors for P0 and P1 depend on the distance between the two reference frames and the current frame. In some embodiments, a higher weighting factor is assigned to P0 if the distance between reference picture of P0 is smaller than that of the reference frame of P1. In some embodiments, multiple predefined weighting factor pairs are stored in a look-up table. In some embodiments, the decision on which weighting factor pairs are used is implicitly derived based on the distance between the two reference frames and the current frame and/or whether a current area is outside of the corresponding reference picture for P0 or P1.

In some embodiments, the weighting factors are gradually increased/decreased starting from the reference boundary (or boundary in reference picture) for P0 (e.g., reference boundary 566) or P1 (e.g., reference boundary 568). For example, for P0, the first row from the boundary uses a weighting factor w0, the second row uses a weighting factor w0+d, and the third row uses w0+2d, while the corresponding first row in P1 uses 64−w0, the second row uses 64−w0−d, and the third row uses 64−w0−2d.

In some embodiments, the weighting factors are generated using wedge mask generation equations (e.g., Equation 2) to calculate a distance between the sample position (e.g., within Area 562) and the reference boundary in P0 (or P1). Depending on the blending function, the corresponding weighting factors may be calculated using look-up tables and/or clamp functions (e.g., Equation 4).

In some embodiments, a non-linear blending function such as a sigmoid function, a hyperbolic tangent function, a trigonometric function, an exponential-based function, or a polynomial function is used.

In some embodiments, the areas inside the boundary use the same weight for P0 and/or P1 (e.g., to reduce complexity). For example, P0 may have a weight of 1, and P1 may have a weight of 63.

In some embodiments, motion vectors for a combined prediction are refined using the reconstructed samples such as bilateral matching, template matching, or other matching method at block or subblock level (e.g., decoder side motion vector refinement, optical-flow-based refinement, etc.). In some embodiments, the compound out of boundary prediction (e.g., as illustrated in FIGS. 5E and 5F) is combined with a MV refinement process.

In some embodiments, when a block (e.g., a current block 510) is inter-predicted using two or more reference blocks from reference frames, such as reference block 556 and reference block 558 in FIG. 5E, the shaded areas are inside of a boundary of a corresponding reference picture, whereas the nonshaded areas are outside of a corresponding reference picture boundary. In some embodiments, the "both inside" area (e.g., area 560) uses a simple average to generate the prediction block for a current block, which is the same as the regular bi-directional prediction. In some embodiments, the rest of the areas (e.g., including the "one side in and one side out" area (e.g., area 562) and the "both outside" area (e.g., area 564) use a weighted prediction (e.g., an implicit masked blending mode or implicit masked blending method) to generate the prediction sample for the current block. In some embodiments, the weighting factors (e.g., weights) of the weighted prediction are not explicitly signaled and are determined at the time of decoding.

In some embodiments, when the current block uses a block-based refinement or a subblock-based refinement approach, in which the reference block samples and the reference blocks correspond to the "one side in and one side out" area or the "both outside" area, an implicit masked blending method is disabled (e.g., the MV refinement method and the implicit masked blending method are exclusive).

In some embodiments, the MV refinement method and the implicit masked blending method are exclusive. For example, the exclusion depends on a signaled refinement MV flag (e.g., if the signaled flag enables refinement MV, the implicit masked blending mode is disabled, and/or if the signaled flag disables refinement MV, the implicit masked blending mode is enabled. In some embodiments, the exclusion depends on predefined rules (e.g., for specific mode) when the MV refinement method is not indicated by a signaled syntax element in the bitstream. Such an approach can be less computationally complex and simplest to implement computationally as compared to other approaches (such as those described below) where the MV refinement and implicit masked blending modes are not mutually exclusive.

In some embodiments, if the implicit masked blending mode is applicable for a current block (e.g., when at least of a first predictor, P0 (e.g., corresponding to reference block 556) and a second predictor, P1 (e.g., corresponding to reference block 558) is located outside of a corresponding picture boundary), and the MV refinement method (e.g., decoder side motion vector refinement or optical-flow-based refinement) is enabled for the current block, the implicit masked blending method is only applied on the final motion compensation stage based on the refined MV from the MV refinement method. In some embodiments, during an MV refinement process that involves the reference samples, the implicit masked blending method is not used, and a simple average is used for the compound/bi-prediction case. Not applying implicit masked blending during the MV refinement process simplifies the process and reduces potential delays in hardware implementation, while applying the implicit masked blending after the MV refinement process improves coding accuracy. See, e.g., B1 below:

In some embodiments, if implicit masked blending is applicable to the current block, and the MV refinement method is enabled for the current block, the implicit masked blending method is applied both for intermediate motion compensation and final motion compensation of the MV refinement method. Applying the implicit masked blending method for intermediate motion compensation and final motion compensation enables enhanced coding performance (improved encoding/decoding accuracy) to be achieved.

In some embodiments, during bilateral matching of decoder side motion vector refinement search, if at least one block/subblock is located outside a respective picture boundary (e.g., corresponding to the "one side in and one side out" area or the "both outside" area), an implicit mask is applied for an intermediate motion compensation that is used for bilateral matching cost evaluation. In some embodiments, after the intermediate motion compensation, an implicit masked blending method is applied on the final motion compensation that produces the refinement MV (e.g., the final refinement MV, RefinedMV0), RefinedMV1 in FIG. 5A) for better performance as compared to applying the masked implicit blending during intermediate motion compensation.

In some embodiments, during optical based MV refinement, implicit masked blending is applied on the intermediate computation. At the final motion compensation with refinement MV, the implicit masked blending method is also applied for better performance. By applying the implicit masked blending method on both the intermediate and the final motion compensation, the best coding performance may be achieved (e.g., having the best coding accuracy).

In some embodiments, an area common to both the reference block 556 and the reference block 558 that is inside the respective reference boundary (e.g., area 560)) or an area common to both the reference block 556 and the reference block 558 that outside the respective reference boundary (e.g., area 564) is averaged using a simple average (e.g., an unweighted average). In some embodiments, an area that comprises (a) one reference block inside the respective reference boundary and (b) the other reference block outside the respective reference boundary (e.g., area 562) is combined using implicit masked weighting.

(A1) In one aspect, some embodiments include a method (e.g., the method 600) of video encoding. In some embodiments, the method is performed at a computing system (e.g., the server system 112) having memory and control circuitry. In some embodiments, the method is performed at a coding module (e.g., the coding module 320). In some embodiments, the method is performed at a source coding component (e.g., the source coder 202), a coding engine (e.g., the coding engine 212), and/or an entropy coder (e.g., the entropy coder 214). The method includes: (i) receiving a current block within a current picture: (ii) determining that the current block is to be encoded in a sub-block-based motion vector (MV) refinement mode using information from a first reference block and a second reference block (e.g., a compound prediction mode); (iii) determining that at least one of the first reference block and the second reference block is at least partially outside of a corresponding reference boundary (e.g., the reference boundary 566 or the reference boundary 568); (iv) deriving a refined first MV indicating a first location of the first reference block and a refined second MV indicating a second location of the second reference block; (v) in accordance with a determination that (i) the first location is outside of a first set of reference boundaries (e.g., the Area 562) and/or (ii) the second location is outside of a second set of reference boundaries (e.g., the Area 580), encoding the current block using a weighted average of respective values from the first and second locations. For example, the corresponding reference boundary is a picture boundary, a slice boundary, a subpicture boundary, or a tile boundary.

(A2) In some embodiments of A1, the method further includes transmitting the encoded portion via a video bitstream.

(A3) In some embodiments of A1 or A2, the method further includes in accordance with a determination that (i) the first location is within the first set of reference boundaries and (ii) the second location is within the second set of reference boundaries, encoding the current block using an average of reference values from the first and second locations.

(A4) In some embodiments of any of A1-A3, the method further includes identifying a first MV corresponding to the first reference block and identifying a second MV corresponding to the second reference block, where the refined first MV is derived from the first MV and the refined second MV is derived from the second MV.

(A5) In some embodiments of any of A1-A4, the refined first MV and the refined second MV are derived via bilateral matching or template matching at a subblock level.

(A6) In some embodiments of any of A1-A5, the refined first MV and the refined second MV are derived via an MV refinement process, and the MV refinement process does not include using a weighted average of respective values from the first and second reference blocks.

(A7) In some embodiments of any of A1-A6, the first set of reference boundaries and the second set of reference boundaries are respective sets of picture boundaries.

(A8) In some embodiments of any of A1-A7, the first set of reference boundaries and the second set of reference boundaries are respective sets of slice boundaries, subpicture boundaries, or tile boundaries.

(B1) In another aspect, some embodiments include a method (e.g., the method 650) of video decoding. In some embodiments, the method is performed at a computing system (e.g., the server system 112) having memory and control circuitry. In some embodiments, the method is performed at a coding module (e.g., the coding module 320). In some embodiments, the method is performed at a parser (e.g., the parser 254), a motion prediction component (e.g., the motion compensation prediction unit 260), and/or an intra prediction component (e.g., intra picture prediction unit 262). The method includes: (i) receiving a video bitstream (e.g., a coded video sequence) comprising a current block (e.g., the current bock 510) within a current picture (e.g., the current picture 502) and one or more syntax elements: (ii) determining, based on the one or more syntax elements, that the current block is encoded in a subblock-based motion vector (MV) refinement mode using information from a first reference block (e.g., the reference block 514) and a second reference block (e.g., the reference block 512); (iii) determining that at least one of the first reference block and the second reference block is at least partially outside of a corresponding reference boundary: (iii) in accordance with a determination that (a) the first location is outside of a first set of reference boundaries and/or (b) the second location is outside of a second set of reference boundaries, decoding the current block using a weighted average of respective values from the first and second locations. In some embodiments, the respective weights are not signaled in the video bitstream (e.g., are derived at a decoder component). In some embodiments, determining that the current block is encoded using information from the first reference block and the second reference block comprises determining that the current block is to be predicted in a compound prediction mode (e.g., a compound inter prediction mode). For example, if the current block is applicable for implicit masked blending (e.g., at least one side of a predictor block is located outside of a corresponding reference boundary (e.g., a picture boundary)), and the MV refinement method (e.g., decoder side motion vector refinement) is enabled for the current block, an implicit masked blending method is only applied on the final motion compensation stage based on the refined MV from the MV refinement method. Specifically, a decoder may apply a MV refinement to generate a refined first MV indicating a first location of the first reference block and a refined second MV indicating a second location of the second reference block. Subsequent to applying the MV refinement, in accordance with a determination that (i) the first location is outside of a first set of reference boundaries and/or (ii) the second location is outside of a second set of reference boundaries, the decoder then decodes the current block using a weighted average of respective values from the first and second locations.

The refined MV output from the final motion compensation stage does not undergo further changes before implicit masked blending is applied. In an example implicit masked blending method, when one block is inter-predicted with two or more reference blocks from reference frames, the "both inside" areas use a simple average to generate a prediction block for the current block (e.g., a regular bi prediction process). In this example, the other areas (including "one side in and one side out" and "both outside" areas) use a weighted prediction to generate the prediction sample for the current block. In some embodiments, the one or more syntax elements include a high-level syntax (HLS) element. In some embodiments, the HLS is signaled at a level that is higher than a block level. For example, the HLS may correspond to a sequence level, a frame level, a slice level, or a tile level. As another example, the HLS may be signaled in a video parameter set (VPS), a sequence parameter set (SPS), a picture parameter set (PPS), an adaptation parameter set (APS), a slice header, a picture header, a tile header, and/or a CTU header.

(B2) In some embodiments of B1, the method further includes in accordance with a determination that (i) the first location is within the first set of reference boundaries and (ii) the second location is within the second set of reference boundaries, decoding the current block using an average of reference values from the first and second locations. For example, the average of the reference values is an unweighted average.

(B3) In some embodiments of B1 or B2, the method further includes identifying a first MV corresponding to the first reference block and identifying a second MV corresponding to the second reference block, where the refined first MV is derived from the first MV and the refined second MV is derived from the second MV.

(B4) In some embodiments of any of B1-B3, applying the MV refinement to generate the refined first MV and the refined second MV includes deriving the refined first MV and the refined second MV via bilateral matching or template matching at a subblock level. In some embodiments, if the current block is applicable for implicit masked blending and the MV refinement method is enable for the current block, the implicit masked blending method is applied both for intermediate motion compensation and final motion compensation of the MV refinement method. A benefit of these embodiments is to improve accuracy/performance. As an example, during bilateral matching of decoder side motion vector refinement search, if at least one block/subblock is located outside a corresponding reference boundary, the implicit mask is applied for the intermediate motion compensation that is used for bilateral matching cost evaluation. In this example, at the final motion compensation with refinement MV, the implicit masked blending method is also applied.

(B5) In some embodiments of any of B1-B4, applying the MV refinement to generate the refined first MV and the refined second MV includes deriving the refined first MV and the refined second MV via the MV refinement process, and the MV refinement process does not include using a weighted average of respective values from the first and second reference blocks. For example, during MV refinement process that involves the reference samples, the implicit masked blending method is not considered, and simple average is used for compound/bi prediction case. A benefit of this is to simplify the MV refinement process and reduce potential delay in the hardware implementation.

(B6) In some embodiments of any of B1-B5, the first set of reference boundaries and the second set of reference boundaries are respective sets of picture boundaries.

(B7) In some embodiments of any of B1-B6, the first set of reference boundaries and the second set of reference boundaries are respective sets of slice boundaries, subpicture boundaries, or tile boundaries.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A8 and B1-B7 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A8 and B1-B7 above).

It will be understood that, although the terms "first," "second," etc. may be used herein to describe various elements, these elements should not be limited by these terms. These terms are only used to distinguish one element from another. The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments.

However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of video decoding performed at a computing system having memory and one or more processors, the method comprising:

receiving a video bitstream comprising a current block, wherein the current block is encoded in an optical-flow motion vector (MV) refinement mode using information from a first reference block and a second reference block;

determining that at least one of the first reference block and the second reference block is at least partially outside of a corresponding reference boundary;

applying an optical-flow MV refinement to generate a refined first MV indicating a first location of the first reference block and a refined second MV indicating a second location of the second reference block, wherein the optical-flow MV refinement process uses simple averaging for intermediate compensation; and subsequent to completing the optical-flow MV refinement:

when (i) the first location is outside of a first set of reference boundaries or the second location is outside of a second set of reference boundaries, decoding the current block using a weighted average of respective values from the first and second locations; and when (i) the first location is within the first set of reference boundaries and (ii) the second location is within the second set of reference boundaries, decoding the current block using a simple average of respective values from the first and second locations.

2. The method of claim 1, further comprising identifying a first MV corresponding to the first reference block and identifying a second MV corresponding to the second reference block, wherein the refined first MV is derived from the first MV and the refined second MV is derived from the second MV.

3. The method of claim 1, wherein applying the MV refinement to generate the refined first MV and the refined second MV includes deriving the refined first MV and the refined second MV via bilateral matching or template matching at a subblock level.

4. The method of claim 1, wherein applying the MV refinement to generate the refined first MV and the refined second MV includes deriving the refined first MV and the refined second MV via an MV refinement process, and wherein the MV refinement process does not include using a weighted average of respective values from the first and second reference blocks.

5. The method of claim 1, wherein the first set of reference boundaries and the second set of reference boundaries are respective sets of picture boundaries.

6. The method of claim 1, wherein the first set of reference boundaries and the second set of reference boundaries are respective sets of slice boundaries, subpicture boundaries, or tile boundaries.

7. The method of claim 1, further comprising, when (i) the first location is outside of the first set of reference boundaries and (ii) the second location is outside of the second set of reference boundaries, decoding the current block using the simple average of respective values from the first and second locations.

8. The method of claim 1, further comprising, when (i) the first location is outside of the first set of reference boundaries and (ii) the second location is outside of the second set of reference boundaries, decoding the current block using a weighted average of respective values from the first and second locations.

9. The method of claim 1, wherein:

when (i) the first location is outside of the first set of reference boundaries and (ii) the second location is within the second set of reference boundaries, the current block is decoded using a first set of weights; and when (i) the first location is within the first set of reference boundaries and (ii) the second location is outside of the second set of reference boundaries, the current block is decoded using a second set of weights, different than the first set of weights.

10. The method of claim 1, wherein the first location is outside of the first set of reference boundaries, and wherein padding is applied for samples located outside of the first set of reference boundaries.

11. The method of claim 1, wherein the second location is outside of the second set of reference boundaries, and wherein padding is applied for samples located outside of the second set of reference boundaries.

12. A method of video encoding performed at a computing system having memory and one or more processors, the method comprising:

receiving video data that comprises a current block within a current picture;

determining that the current block is to be encoded in an optical-flow motion vector (MV) refinement mode using information from a first reference block and a second reference block;

determining that at least one of the first reference block and the second reference block is at least partially outside of a corresponding reference boundary;

deriving, via the optical-flow MV refinement mode, a refined first MV indicating a first location of the first reference block and a refined second MV indicating a second location of the second reference block, wherein the optical-flow MV refinement mode uses simple averaging for intermediate compensation; and after deriving the refined first MV and the refined second MV:

when (i) the first location is outside of a first set of reference boundaries or (ii) the second location is outside of a second set of reference boundaries, encoding the current block using a weighted average of respective values from the first and second locations; and when (i) the first location is within the first set of reference boundaries and (ii) the second location is within the second set of reference boundaries, encoding the current block using a simple average of respective values from the first and second locations.

13. The method of claim 12, further comprising identifying a first MV corresponding to the first reference block and identifying a second MV corresponding to the second reference block, wherein the refined first MV is derived from the first MV and the refined second MV is derived from the second MV.

14. The method of claim 12, wherein applying the MV refinement to generate the refined first MV and the refined second MV includes deriving the refined first MV and the refined second MV via bilateral matching or template matching at a subblock level.

15. The method of claim 12, wherein applying the MV refinement to generate the refined first MV and the refined second MV includes deriving the refined first MV and the refined second MV via an MV refinement process, and wherein the MV refinement process does not include using a weighted average of respective values from the first and second reference blocks.

16. The method of claim 12, wherein the first set of reference boundaries and the second set of reference boundaries are respective sets of picture boundaries.

17. The method of claim 12, wherein the first set of reference boundaries and the second set of reference boundaries are respective sets of slice boundaries, subpicture boundaries, or tile boundaries.

18. The method of claim 12, further comprising, when (i) the first location is outside of the first set of reference boundaries and (ii) the second location is outside of the second set of reference boundaries, encoding the current block using the simple average of respective values from the first and second locations.

19. A method of video media bitstream generation, the method comprising:
  generating a video bitstream, including:
    receiving video data that comprises a current block within a current picture;
    determining that the current block is to be encoded in an optical-flow motion vector (MV) refinement mode using information from a first reference block and a second reference block;

determining that at least one of the first reference block and the second reference block is at least partially outside of a corresponding reference boundary;
    deriving, via the optical-flow MV refinement mode, a refined first MV indicating a first location of the first reference block and a refined second MV indicating a second location of the second reference block, wherein the optical-flow MV refinement mode uses simple averaging for intermediate compensation; and
    after deriving the refined first MV and the refined second MV:
      when (i) the first location is outside of a first set of reference boundaries or (ii) the second location is outside of a second set of reference boundaries, encoding the current block using a weighted average of respective values from the first and second locations; and
      when (i) the first location is within the first set of reference boundaries and (ii) the second location is within the second set of reference boundaries, encoding the current block using a simple average of respective values from the first and second locations; and
  transmitting the video bitstream including coded information for the current block and current picture.

20. The method of claim 1, wherein the optical-flow MV refinement mode comprises a temporal interpolated prediction mode.

* * * * *